US010827118B2

(12) United States Patent
Stening et al.

(10) Patent No.: US 10,827,118 B2
(45) Date of Patent: Nov. 3, 2020

(54) SYSTEM FOR PANORAMIC IMAGING (71) Applicant: AXIS AB, Lund (SE)

(72) Inventors: Johan Stening, Lund (SE); Henrik Persson, Lund (SE); Agnes Rusz, Lund (SE); Andree Bengtsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/679,739

(22) Filed: Nov. 11, 2019

(65) Prior Publication Data
US 2020/0195845 A1 Jun. 18, 2020

(30) Foreign Application Priority Data

Dec. 14, 2018 (EP) .................................... 18212613

(51) Int. Cl.
*H04N 5/232* (2006.01)
*H04N 5/262* (2006.01)

(52) U.S. Cl.
CPC ....... *H04N 5/23238* (2013.01); *H04N 5/2628* (2013.01)

(58) Field of Classification Search
CPC .......................... H04N 5/23238; H04N 5/2628
See application file for complete search history.

(56) References Cited

U.S. PATENT DOCUMENTS

| 10,585,344 | B1* | 3/2020 | Lablans | H04N 13/246 |
| 2011/0211040 | A1* | 9/2011 | Lindemann | G01S 19/14 |
| | | | | 348/36 |
| 2013/0250046 | A1 | 9/2013 | Schofield et al. | |
| 2014/0300687 | A1* | 10/2014 | Gillard | H04N 5/2628 |
| | | | | 348/36 |
| 2015/0332446 | A1* | 11/2015 | Wang | H04N 13/243 |
| | | | | 348/37 |
| 2017/0094222 | A1 | 3/2017 | Tangeland et al. | |
| 2018/0122042 | A1* | 5/2018 | Kim | G06F 3/0346 |

FOREIGN PATENT DOCUMENTS

WO 2011107448 9/2011

* cited by examiner

*Primary Examiner* — Maria E Vazquez Colon
(74) *Attorney, Agent, or Firm* — Volpe Koenig (57) ABSTRACT

A tiltable system for panoramic imaging of a scene. The tiltable system includes: a central camera, a first and a second lateral camera arranged to image the scene in different directions relative to a rotation axis, wherein the first and the second lateral camera are arranged on opposing lateral sides of the central camera, wherein the central camera, the first lateral camera, and the second lateral camera each having an imaging system including a lens assembly and an image sensor; a tilting mechanism enabling the tiltable system for panoramic imaging to tilt about the rotation axis; and an image processing unit including a stitching function configured to stitch together images captured by the central camera, the first lateral camera, and the second lateral camera to form a panoramic image of the scene, the panoramic image having a virtual horizon, and to, upon tilting of the tiltable system for panoramic imaging, maintain the position of the virtual horizon of the panoramic image in the scene; wherein the imaging systems of the first and second lateral cameras have a larger field of view in a direction perpendicular to the rotation axis than the imaging system of the central camera.

15 Claims, 4 Drawing Sheets

SYSTEM FOR PANORAMIC IMAGING

INCORPORATION BY REFERENCE

The following documents are incorporated herein by reference as if fully set forth: European Patent Application No. EP 18212613.6, filed Dec. 14, 2018.

TECHNICAL FIELD

The present invention relates to a tiltable system for panoramic imaging.

BACKGROUND OF THE INVENTION

Panoramic imaging is a well-known technique for producing images having an enlarged horizontal field of view. A typical implementation of panoramic imaging consists of a camera, which is used to capture multiple images of a scene from different directions. Usually, the camera is panned between consecutive images and each individual image are aligned and combined into a panorama.

However, an issue when panning a camera for panoramic monitoring of a scene is that the scene can change during the movement of the camera, resulting in the generation of artifacts, in particular in or near overlapping areas. This typically results in panoramas where a feature, e.g. a vehicle or a person, is visible in multiple places. Movement in the scene may also result in ghosting distortions. Another problem in panoramic imaging is that straight lines in a scene may be bent in the panorama depicting the scene, which is a consequence of representing a curved view in a flat image. Typically, along a horizon in the center of the panorama these image distortions in the panorama are the smallest and the distortions increase as the distance to the center horizon increases. For example, at the horizon, straight lines in the scene appear straight in the panorama, while a straight line in the scene appears more bent in the panorama the further it is from the horizon, e.g. near the top or bottom. These issues become even more problematic for panoramic imaging in case the camera is allowed to tilt. During tilting, the above-described image distortions result in very complex image flows in the panorama. This will, in turn, make it difficult to interpret the panorama for a person or image review algorithm in charge of monitoring the scene. Thus, there is a need for an improved system for panoramic imaging.

SUMMARY OF THE INVENTION

In view of the above, it is an objective of the present invention to provide a tiltable system for panoramic imaging.

It is an objective to mitigate, alleviate or eliminate one or more of the above-identified deficiencies in the art and disadvantages singly or in any combination and solve at least the above mentioned problem.

According to a first aspect a tiltable system for panoramic imaging of a scene is provided. The tiltable system comprises: a central camera, a first lateral camera and a second lateral camera arranged to image the scene in different directions relative to a rotation axis, wherein the first lateral camera and the second lateral camera are arranged on opposing lateral sides of the central camera, wherein the central camera, the first lateral camera, and the second lateral camera each having an imaging system comprising a lens assembly and an image sensor; a tilting mechanism enabling the tiltable system for panoramic imaging to tilt about the rotation axis; and an image processing unit comprising a stitching function configured to stitch together images captured by the central camera, the first lateral camera, and the second lateral camera to form a panoramic image of the scene, the panoramic image having a virtual horizon, and to, upon tilting of the tiltable system for panoramic imaging, maintain the position of the virtual horizon of the panoramic image in the scene; wherein the imaging systems of the first and second lateral cameras have a larger field of view in a direction perpendicular to the rotation axis than the imaging system of the central camera.

The wording "lens assembly" should, within the context of this application, be construed as optics configured to image the scene onto an image sensor of a camera.

The wording "virtual horizon" should, within the context of this application, be construed as a line in the panoramic image, at which distortions in the panoramic image are the smallest. In other words, the virtual horizon may be a line of least distortion in the panoramic image. Distortions in a panoramic image may be a result of the stitching of individual images.

Maintaining the position of the virtual horizon of a panoramic image in the scene may correspond to portions of the virtual horizon moving up and down in each image captured by the cameras upon tilting the tiltable system. The virtual horizon may shift differently over the lateral extension of the panorama, since each image may be captured in different lateral directions relative to each other. The virtual horizon may, upon tilting of the tiltable system, shift less for larger lateral angles than in the center. In a prior art system for panoramic image, there will not be enough data in the images when the virtual horizon is straightened, why the panorama will be cropped in an unsightly manner.

By means of the present inventive concept, it is possible to maintain the position of the virtual horizon in the panoramic image, since the field of view of the imaging systems of the first and second lateral cameras is larger in the direction perpendicular to the rotation axis than the imaging system of the central camera. The present tiltable system thereby reduces a complexity of an image flow in the panoramic image upon tilting the tiltable system for panoramic imaging by maintaining the position of the virtual horizon of the panoramic image in the scene. Thereby, the present tiltable system for panoramic imaging results in a system more suitable for panoramic monitoring of a scene.

The lens assemblies of the first and second lateral cameras may be configured to provide a larger field of view than the lens assembly of the central camera.

An advantage of the lens assemblies of the first and second lateral cameras providing a larger field of view than the lens assembly of the central camera is that the same type of image sensor may be used in the lateral cameras and in the central camera. Using the same type of image sensor for the lateral cameras and the central camera may reduce a complexity of the image stitching for forming the panoramic image. Reducing the complexity of the image stitching may reduce computational power and related costs needed for forming the panoramic image.

A zoom setting of the lens assemblies of the first and second lateral cameras may be configured to provide a larger field of view than a zoom setting of the lens assembly of the central camera.

An advantage of configuring a zoom setting of the lens assemblies of the first and second lateral cameras to provide a larger field of view than a zoom setting of the lens assembly of the central camera is that the same type of camera and lens assemblies may be used for the lateral cameras and the central camera. Using the same type of camera and lens assemblies for the lateral cameras and the central camera may reduce a complexity of the image stitching for forming the panoramic image. Reducing the complexity of the image stitching may reduce computational power and related costs needed for forming the panoramic image.

The tiltable system for panoramic imaging may further comprise a controller configured to control the zoom settings of the lens assemblies of the first and second lateral cameras, wherein the zoom settings of the lens assemblies of the first and second lateral cameras may be based on a tilt of the tiltable system for panoramic imaging.

An advantage of basing the zoom settings of the lens assemblies of the first and second lateral cameras on the tilt of the tiltable system for panoramic imaging is that the field of view of the first and second lateral cameras may be set based on the tilt of the tiltable system. In other words, the first and second lateral cameras may be configured to capture the scene with the field of view needed to maintain the position of the virtual horizon. Thereby, image sensors of the first and second lateral cameras may be used more efficiently. Further, a bandwidth need associated with image data captured by the first and second lateral cameras may be reduced.

The tiltable system for panoramic imaging may further comprise a gyroscope configured to determine the tilt of the tiltable system for panoramic imaging.

An advantage of the tiltable system further comprising a gyroscope is that a tilt of the tiltable system may be determined directly. A further advantage of using a gyroscope to directly determine the tilt of the tiltable system may be that the tilt does not need to be determined from the panoramic image, thereby reducing processing power needed by the tiltable system.

A further advantage of the tiltable system further comprising a gyroscope is that the tilt of the tiltable system may be used when maintaining the position of the virtual horizon in the panoramic image.

The image sensors of the first lateral camera and the second lateral camera may have a larger extension in a direction perpendicular to the rotation axis than the image sensor of the central camera so as to provide the larger field of view in the direction perpendicular to the rotation axis.

The image sensors of the central camera, the first lateral camera, and the second lateral camera may be rectangular, wherein the image sensors of the first and second lateral cameras may be oriented with a longer side thereof at an angle relative to the rotation axis, and wherein the image sensor of the central camera may be oriented with a longer side thereof parallel to the rotation axis, so as to provide the larger field of view in the direction perpendicular to the rotation axis.

An advantage of orienting the image sensors of the first and second lateral cameras with a longer side thereof at an angle relative to the rotation axis is that the same type of image sensor may be used for the lateral cameras and the central camera. Using the same type of image sensor for the lateral cameras and the central camera may reduce a complexity of the image stitching for forming the panoramic image. Reducing the complexity of the image stitching may reduce computational power and related costs needed for forming the panoramic image.

The tilting mechanism may comprise a tilting motor.

An advantage of the tilting mechanism comprising a tilting motor is that the tilt of the tiltable system may be controlled remotely by an operator.

The wording "operator" should, within the context of this application, be construed as a person in charge operating the tiltable system for panoramic imaging.

A portion of the scene depicted by the first lateral camera may partially overlap a first portion of the scene depicted by the central camera, and wherein a portion of the scene depicted by the second lateral camera may partially overlap a second portion of the scene depicted by the central camera.

An advantage of partially overlapping portions of the scene depicted by the first lateral camera and the central camera is that a better alignment of the first lateral image and the central image may be realized, since one or more features in the scene may be depicted in both the first lateral image and the central image simultaneously.

An advantage of partially overlapping portions of the scene depicted by the second lateral camera and the central camera is that a better alignment of the second lateral image and the central image may be realized, since one or more features in the scene may be depicted in both the second lateral image and the central image simultaneously.

The image processing unit may further comprise: a feature-recognition function, configured to recognize features related to the virtual horizon in a central image, a first lateral image, and a second lateral image; an image data transform function, configured to spatially transform image data of the first and second lateral images, wherein the spatial transform is based on the position of the virtual horizon; and an alignment function, configured to align the features related to the virtual horizon in the central image with the features related to the virtual horizon in the first and second lateral images.

An advantage of basing the spatial transform on the position of the virtual horizon in the panoramic image is that it may reduce a complexity of image flow when tilting the tiltable system for panoramic imaging.

The feature-recognition function may be further configured to determine a change of a tilt of the tiltable system based on recognized features in the central image, the first lateral image, and/or the second lateral image.

An advantage of the feature-recognition function being further configured to determine a change of a tilt of the tiltable system based on recognized features in the images is that additional sensors, such as a gyroscope, may not be needed to track the tilt of the tiltable system.

The spatial transform in the image data transform function may be further based on the tilt of the tiltable system.

An advantage of basing the spatial transform on the tilt of the tiltable system is that it may reduce the processing power needed to maintain the position of the virtual horizon in the panoramic image.

The spatial transform in the image data transform function may be further based on a model of the tiltable system for panoramic imaging.

An advantage of basing the image data transform function on a model of the tiltable system for panoramic imaging is that it may allow for reducing image distortions in the panoramic image.

The image processing unit may further comprise a cropping function, configured to crop the panoramic image into a rectangular shape.

The tiltable system for panoramic imaging may further comprise: a third lateral camera and a fourth lateral camera arranged to image the scene in different directions relative to the rotation axis, wherein the third lateral camera and the fourth lateral camera are arranged on opposing lateral sides of the first lateral camera and the second lateral camera, wherein the third lateral camera and the fourth lateral camera each having an imaging system comprising a lens assembly and an image sensor; wherein the stitching function is further configured to stitch together images captured by the central camera, the first lateral camera, the second lateral camera, the third lateral camera, and the fourth lateral camera to form a panoramic image of the scene; and wherein the imaging systems of the third and fourth lateral cameras have a larger field of view in a direction perpendicular to the rotation axis than the imaging systems of the first and second lateral cameras.

An advantage of the tiltable system for panoramic imaging further comprising a third and a fourth lateral camera may be an increased lateral field of view of the tiltable system for panoramic imaging.

The tiltable system for panoramic imaging may further comprise: a further central camera arranged to image the scene in a direction relative to the rotation axis, wherein the further central camera is arranged on a lateral side of the central camera, wherein the first lateral camera and the second lateral camera are arranged on opposing lateral sides of the central camera and the further central camera, wherein the further central camera has an imaging system comprising a lens assembly and an image sensor; and wherein the stitching function is further configured to stitch together images captured by the central camera, the further central camera, and the lateral cameras to form a panoramic image of the scene.

An advantage of the tiltable system for panoramic imaging further comprising a further central camera may be an increased lateral field of view of the tiltable system for panoramic imaging.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular component parts of the systems described as such system may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

Figure 1:
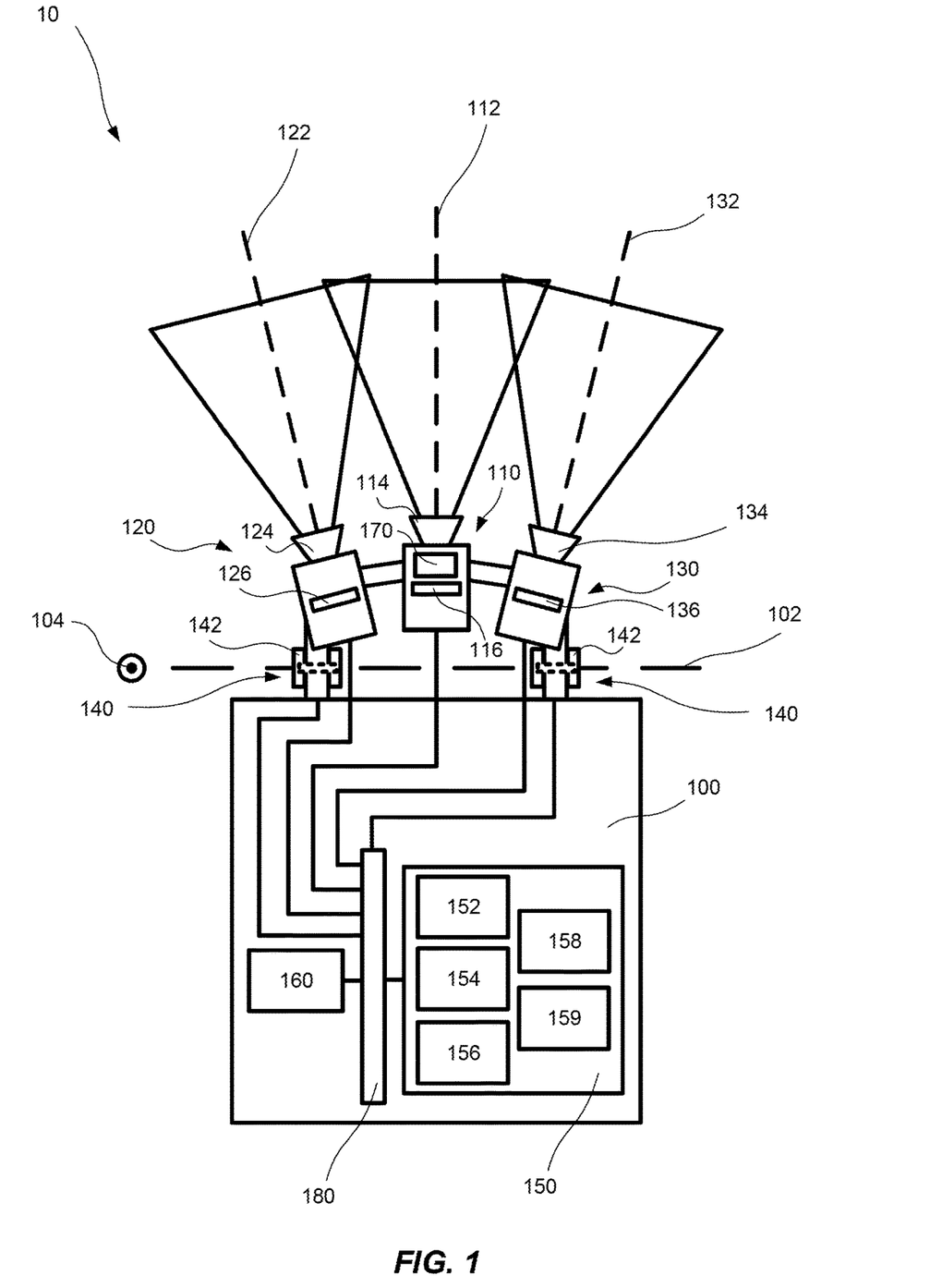
FIG. 1 illustrates a top view of a tiltable system for panoramic imaging.

FIG. 1 illustrates a tiltable system 10 for panoramic imaging of a scene. The tiltable system 10 comprises a central camera 110, a first lateral camera 120 and a second lateral camera 130 arranged to image the scene in different directions 112, 122, 132 relative to a rotation axis 102. The central camera 110, the first lateral camera 120 and the second lateral camera 130 may be arranged along a straight line. Alternatively, the central camera 110, the first lateral camera 120 and the second lateral camera 130 may be arranged along a curved line. The central camera 110, the first lateral camera 120, and the second lateral camera 130 may be arranged on different heights in a direction 104 perpendicular to the rotation axis 102. The central camera 110 may image the scene in a central direction 112. The first lateral camera 120 may image the scene in a first direction 122. The second lateral camera 130 may image the scene in a second direction 132. An angle between the central direction 112 and the first direction 122 may be less than 90°. An angle between the central direction 112 and the second direction 132 may be less than 45°.

The first lateral camera 120 and the second lateral camera 130 are arranged on opposing lateral sides of the central camera 110. The central camera 110, the first lateral camera 120, and the second lateral camera 130 each has an imaging system comprising a lens assembly 114, 124, 134 and an image sensor 116, 126, 136. The lens assemblies 114, 124, 134 may be pluralities of lenses, camera objectives, and/or zoom objectives. The image sensors 116, 126, 136 may be CCD and/or CMOS sensors. Relative positions of the central camera 110, the first lateral camera 120, and the second lateral camera 130 may be fixed. In other words, the central camera 110, the first lateral camera 120, and the second lateral camera 130 may have restricted movement relative to each other. The tiltable system 10 for panoramic imaging may be calibrated with respect to the relative positions of the central camera 110, the first lateral camera 120, and the second lateral camera 130. The tiltable system 10 may be calibrated with respect to differences between the central camera 110, the first lateral camera 120, and the second lateral camera 130. The tiltable system 10 may be calibrated with respect to parameters of the image sensors 116, 126, 136 of the central camera 110, the first lateral camera 120, and the second lateral camera 130. Parameters of the image sensors 116, 126, 136 may be one or more of a quantum efficiency, an exposure time, a sensor gain, a number of pixels, and a pixel density. The tiltable system 10 may be calibrated with respect to parameters of the lens assemblies 114, 124, 134 of the central camera 110, the first lateral camera 120, and the second lateral camera 130. Parameters of the lens assemblies 114, 124, 134 may be one or more of a magnification, and a transmission. The tiltable system 10 may be calibrated with respect to intrinsic parameters of the cameras 110, 120, 130 of the tiltable system 10. Intrinsic parameter may comprise an optical axis and imaging distortions. The tiltable system 10 may be calibrated with respect to extrinsic parameters of the tiltable system 10. Extrinsic parameters may comprise individual poses of the cameras 110, 120, 130 of the tiltable system 10.

The tiltable system 10 further comprises a tilting mechanism 140 enabling the tiltable system 10 for panoramic imaging to tilt about the rotation axis 102. The tilting mechanism 140 may be fixable, thereby securing the tilt of the tiltable system 10 for panoramic imaging.

The tiltable system 10 further comprises an image processing unit 150 comprising a stitching function 152 configured to stitch together images 310, 320, 330 captured by the central camera 110, the first lateral camera 120, and the second lateral camera 130 to form a panoramic image of the scene. The images 310, 320, 330 comprises a central image 310, a first lateral image 320, and a second lateral image 330. The central image 310 is captured by the central camera 110. The first lateral image 320 is captured by the first lateral camera 120. The second lateral image 330 is captured by the second lateral camera 130. Stitching of images will be described in relation to FIG. 3A-B and FIG. 4A.

The panoramic image has a virtual horizon, and the image processing unit 150 is further configured to, upon tilting of the tiltable system 10 for panoramic imaging, maintain the position of the virtual horizon of the panoramic image in the scene. The image processing unit 150 may be a general processing unit. The image processing unit 150 may be a system on a chip.

The imaging systems of the first and second lateral cameras 120, 130 have a larger field of view 204 in a direction 104 perpendicular to the rotation axis 102 than the imaging system of the central camera 110. The fields of view 214, 204 of the central camera 110 and a lateral camera 200 will be described in relation to FIG. 2A-2B.

The lens assemblies 124, 134 of the first and second lateral cameras 120, 130 may be configured to provide a larger field of view 204 than the lens assembly 114 of the central camera 110. The lens assemblies 124, 134 of the first and second lateral cameras 120, 130 may comprise optics having a shorter focal length than the lens assembly 114 of the central camera 110. The lens assemblies 124, 134 of the first and second lateral cameras 120, 130 may comprise optics having a smaller magnification than the lens assembly 114 of the central camera 110.

A zoom setting of the lens assemblies 124, 134 of the first and second lateral cameras 120, 130 may be configured to provide a larger field of view 204 than a zoom setting of the lens assembly 114 of the central camera 110.

The tiltable system 10 for panoramic imaging may further comprise a controller 160 configured to control the zoom settings of the lens assemblies 124, 134 of the first and second lateral cameras 120, 130, wherein the zoom settings of the lens assemblies 124, 134 of the first and second lateral cameras 120, 130 may be based on a tilt of the tiltable system 10 for panoramic imaging. The controller 160 may be further configured to control the zoom setting of the lens assembly 114 of the central camera 110. The zoom settings of the lens assemblies 124, 134 of the first and second lateral cameras 120, 130 may vary with a change in tilt angle of the tiltable system 10 for panoramic imaging.

The tiltable system 10 for panoramic imaging may further comprise a gyroscope 170 configured to determine the tilt of the tiltable system 10 for panoramic imaging.

Figure 2A:
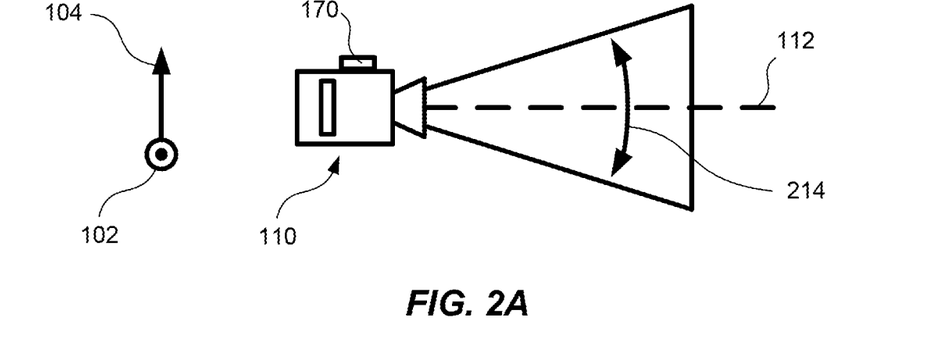
FIG. 2A illustrates a side view of the central camera in the tiltable system for panoramic imaging.

The gyroscope 170 may be arranged near the central camera 110 as exemplified in FIG. 1 and FIG. 2A.

The image sensors 126, 136 of the first lateral camera 120 and the second lateral camera 130 may have a larger extension in a direction 104 perpendicular to the rotation axis 102 than the image sensor 116 of the central camera 110 so as to provide the larger field of view 204 in the direction 104 perpendicular to the rotation axis 102.

The image sensors 126, 136 of the first and second lateral cameras 120, 130 may have a larger extension in a direction parallel to the rotation axis 102 than the image sensor 116 of the central camera 110.

The image sensors 116, 126, 136 of the central camera 110, the first lateral camera 120, and the second lateral camera 130 may be rectangular, wherein the image sensors 126, 136 of the first and second lateral cameras 120, 130 may be oriented with a longer side thereof at an angle relative to the rotation axis 102, and wherein the image sensor 116 of the central camera 110 may be oriented with a longer side thereof parallel to the rotation axis 102, so as to provide the larger field of view 204 in the direction 104 perpendicular to the rotation axis 102.

The first and second lateral cameras 120, 130 may be oriented with a longer side thereof at the angle of 90° relative to the rotation axis 102.

The tilting mechanism 140 may comprise a tilting motor 142. The tilting motor 142 may be controlled by the controller 160.

A portion of the scene depicted by the first lateral camera 120 may partially overlap a first portion 312 of the scene depicted by the central camera 110, and wherein a portion of the scene depicted by the second lateral camera 130 may partially overlap a second portion 314 of the scene depicted by the central camera 110. The partial overlaps will be described in relation to FIG. 3A-B.

The image processing unit 150 may further comprise: a feature-recognition function 154, configured to recognize features 302 related to the virtual horizon in the central image 310, the first lateral image 320, and the second lateral image 330; an image data transform function 156, configured to spatially transform image data of the central image 310, the first lateral image 320, and the second lateral image 330, wherein the spatial transform is based on the position of the virtual horizon; and an alignment function 158, configured to align the features 302 related to the virtual horizon in the central image 310 with the features 302 related to the virtual horizon in the first and second lateral images 320, 330.

The spatial transform of the image data transform function 156 may transform image data of the central image 310, the first lateral image 320, and the second lateral image 330 such that the virtual horizon is straight in the produced panoramic image. The spatial transform of the image data transform function 156 may comprise a projection. The projection may be a cylindrical projection or a spherical projection.

The feature-recognition function 154 may be further configured to determine a change of a tilt of the tiltable system 10 based on recognized features in the central image 310, the first lateral image 320, and/or the second lateral image 330.

The spatial transform in the image data transform function 156 may be further based on the tilt of the tiltable system 10.

The spatial transform in the image data transform function 156 may be further based on a model of the tiltable system 10 for panoramic imaging.

The model of the tiltable system 10 for panoramic imaging may comprise information regarding positions of the central camera 110, the first lateral camera 120, and/or the second lateral camera 130. The model of the tiltable system 10 for panoramic imaging may comprise information regarding the central direction 112, the first lateral direction, and/or the second lateral direction. The model of the tiltable system 10 for panoramic imaging may comprise information regarding the imaging systems of the central camera 110, the first lateral camera 120, and/or the second lateral camera 130. The model of the tiltable system 10 for panoramic imaging may comprise information regarding the lens assemblies 114, 124, 134 and the image sensors 116, 126, 136 of the central camera 110, the first lateral camera 120, and/or the second lateral camera 130.

The image processing unit 150 may further comprise a cropping function 159, configured to crop the panoramic image.

The tiltable system 10 for panoramic imaging may further comprise a databus 180. The central camera 110, the first lateral camera 120, the second lateral camera 130, the tilting mechanism 140, the tilting motor 142, the image processing unit 150, the controller 160, and/or the gyroscope 170 may communicate via the databus 180.

The tiltable system 10 for panoramic imaging may further comprise a housing 100. The housing 100 may comprise the image processing unit 150, the controller 160, and the databus 180. The tilting mechanism 140 may be coupled to the housing 100.

The tiltable system 10 for panoramic imaging may further comprise: a third lateral camera and a fourth lateral camera arranged to image the scene in different directions relative to the rotation axis 102, wherein the third lateral camera and the fourth lateral camera are arranged on opposing lateral sides of the first lateral camera 120 and the second lateral camera 130, wherein the third lateral camera and the fourth lateral camera each having an imaging system comprising a lens assembly and an image sensor; wherein the stitching function 152 is further configured to stitch together images 310, 320, 330 captured by the central camera 110, the first lateral camera 120, the second lateral camera 130, the third lateral camera, and the fourth lateral camera to form a panoramic image of the scene; and wherein the imaging systems of the third and fourth lateral cameras have a larger field of view in a direction 104 perpendicular to the rotation axis 102 than the imaging systems of the first and second lateral cameras 120, 130.

It is to be understood that the third and fourth lateral cameras may, where applicable, have corresponding functions as the first and second lateral cameras 120, 130. In order to avoid undue repetition, reference is therefore made to the above.

The tiltable system 10 for panoramic imaging may further comprise: a further central camera arranged to image the scene in a direction relative to the rotation axis 102, wherein the further central camera is arranged on a lateral side of the central camera 110, wherein the first lateral camera 120 and the second lateral camera 130 are arranged on opposing lateral sides of the central camera 110 and the further central camera, wherein the further central camera has an imaging system comprising a lens assembly and an image sensor; and wherein the stitching function 152 is further configured to stitch together images 310, 320, 330 captured by the central camera 110, the further central camera, and the lateral cameras to form a panoramic image of the scene.

The further central camera may be of the same type as the central camera 110. The imaging systems of the further central camera and the central camera 110 may have a similar field of view in the direction 104 perpendicular to the rotation axis 102. The imaging systems of the further central camera and the central camera 110 may have a similar field of view in a direction parallel to the rotation axis 102.

It is to be understood that the further central camera may, where applicable, have corresponding functions as the central camera 110. In order to avoid undue repetition, reference is therefore made to the above.

FIG. 2A illustrates a side view of the central camera 110 in the tiltable system 10 for panoramic imaging. The central camera 110 has a field of view 214 in a direction 104 perpendicular to the rotation axis 102.

Figure 2B:
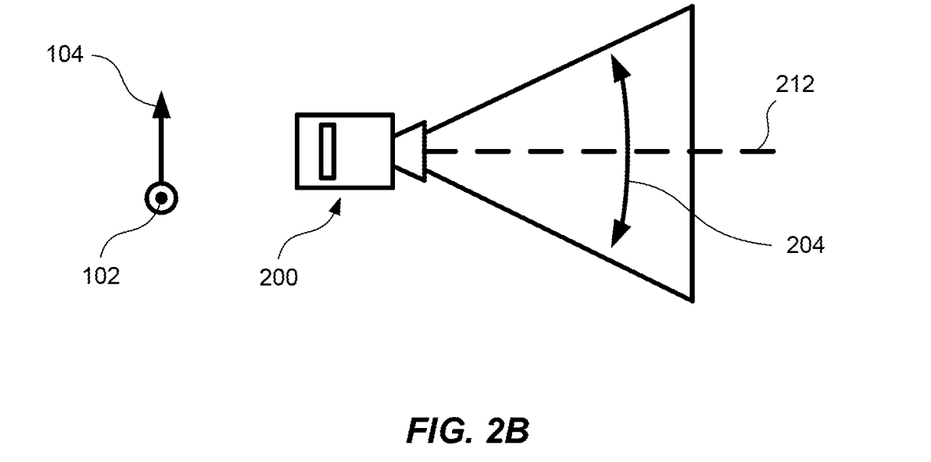
FIG. 2B illustrates a side view of the first lateral camera in the tiltable system for panoramic imaging.

FIG. 2B illustrates a side view of a lateral camera 200 in the tiltable system 10 for panoramic imaging. The lateral camera 200 shown in FIG. 2B may correspond to the first lateral camera 120, the second lateral camera 130, the third lateral camera, and/or the fourth lateral camera. The lateral camera 200 has a field of view 204 in a direction 104 perpendicular to the rotation axis 102. The field of view 204 in a direction 104 perpendicular to the rotation axis 102 is larger than the field of view 214 of the central camera 110.

Figure 3A:
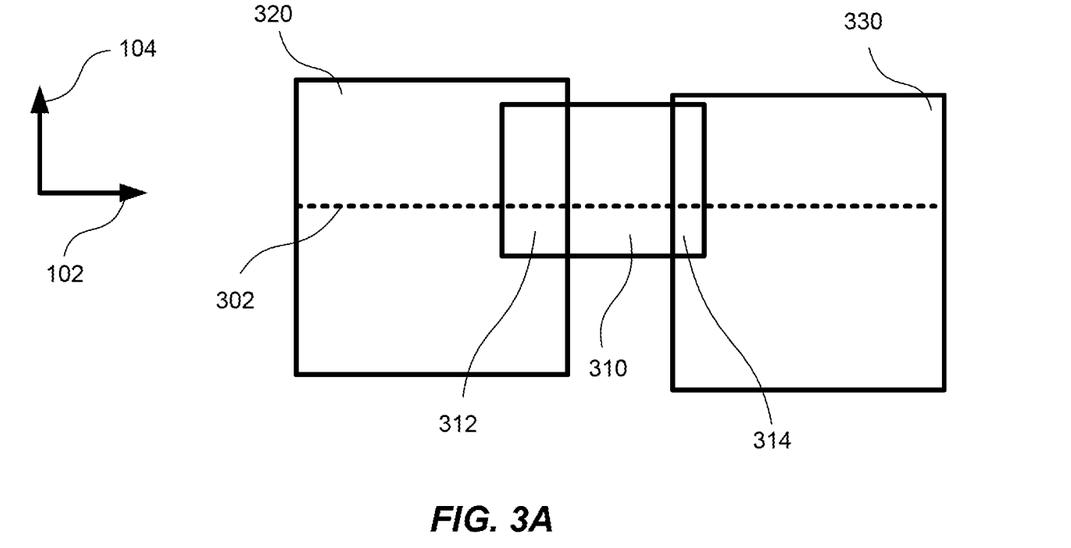
FIG. 3A illustrates images captured by the tiltable system for panoramic imaging.

FIG. 3A illustrates the central image 310, the first lateral image 320, and the second lateral image 330 captured by the tiltable system 10 for panoramic imaging. The first and second lateral images 320, 330 may be rescaled such that objects in the scene have the same size as in the central image 310. As is exemplified in FIG. 3A, a portion of the first lateral image 320 may overlap a first portion 312 of the central image 310, and a portion of the second lateral image 330 may overlap a second portion 314 of the central image 310. The first and second lateral images 320, 330 have been captured by cameras having larger fields of view in the direction 104 perpendicular to the rotation axis 102 than the central camera 110. Thereby, the first and second lateral images 320, 330 comprise a larger portion of the scene in a direction 104 perpendicular to the rotation axis 102 than the central image 310.

As shown in FIG. 3A, features 302 relating to the virtual horizon are present in the central image 310, the first lateral image 320, and the second lateral image 330. The features 302 relating to the virtual horizon may be aligned by the alignment function 158. The images 310, 320, 330 may be stitched together to form a panoramic image. The panoramic image may be cropped by a cropping function 159. The cropped panoramic image may have a rectangular shape.

Figure 3B:
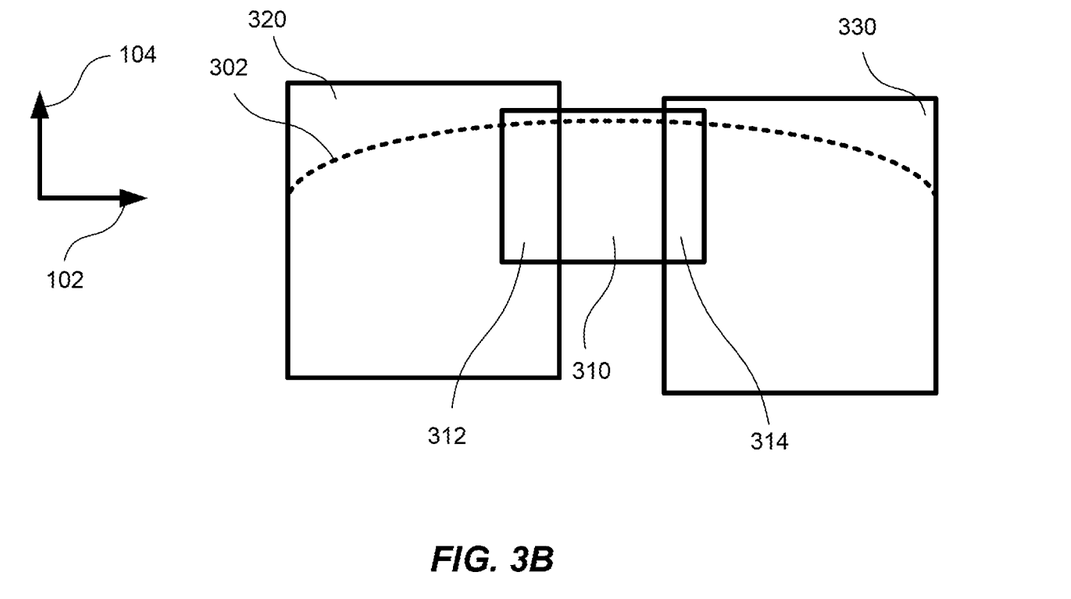
FIG. 3B illustrates images captured by a tilted tiltable system for panoramic imaging.

FIG. 3B illustrates images 310, 320, 330 captured when the tiltable system 10 for panoramic imaging has been slightly tilted as compared to the situation of FIG. 3A. More specifically, the images 310, 320, 330 have been captured when the tiltable system 10 for panoramic imaging has been tilted downwards, thereby shifting features 302 relating to the virtual horizon upwards in the images 310, 320, 330. The tilt amount has been slightly exaggerated for the effect to be clearly visible in FIG. 3B. Features 302 relating to the virtual horizon are shifted upwards in the images 310, 320, 330, and since the first and second lateral cameras 120, 130 are arranged to image the scene in different directions 122, 132 than the central camera 110, the shift will be different over the lateral extension of each image 310, 320, 330. The shift will be greater in the central image 310 than in the first and second lateral images 320, 330 as exemplified in FIG. 3B. The shifts in the first and second lateral images 320, 330 will be smaller for image portions in outer lateral positions than for image portions closer to the central image 310. The image data of the central image 310, the first lateral image 320, and the second lateral image 330 may be spatially transformed such that virtual horizon is straight in a panoramic image formed by the central image 310, the first lateral image 320, and the second lateral image 330. When spatially transforming the image data such that the virtual horizon is straight in the panoramic image, image portions in outer lateral positions is moved further along the direction 104 perpendicular to the rotation axis 102. This will be described in relation to FIG. 4A. If image data in the vicinity of the features 302 relating to the virtual horizon is missing after the spatial transformation, the panoramic image may be cropped in an unsightly manner. Since the first and second lateral images 320, 330 comprise larger portions of the scene in the direction 104 perpendicular to the rotation axis 102 than the central image 310, the features 302 relating to the virtual horizon in the first and second lateral images 320, 330 may be shifted upwards more, without losing image data associated with the scene, than in a system where all cameras have similar fields of view in the direction 104 perpendicular to the rotation axis 102.

Figure 4A:
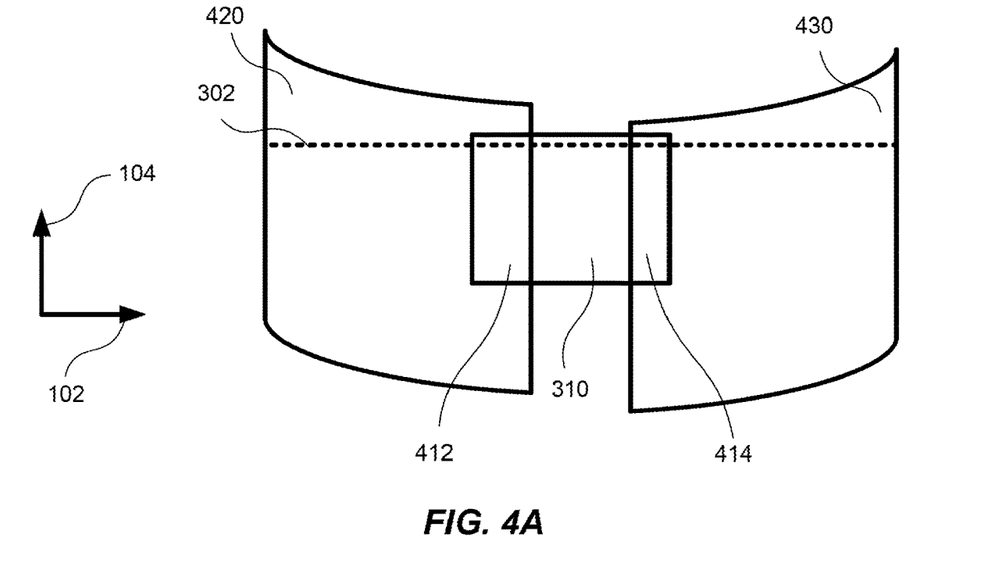
FIG. 4A illustrates spatially transformed images captured by the present system for panoramic imaging.

FIG. 4A illustrates spatially transformed images 420, 430. The spatially transformed first lateral image 420 is a spatial transform of the first lateral image 320 in FIG. 3B. The spatially transformed second lateral image 430 is a spatial transform of the second lateral image 320 in FIG. 3B. As is exemplified in FIG. 4A, in order to produce a panoramic image having a straight virtual horizon, outer lateral portions of the spatially transformed first and second lateral images 420, 430 have been shifted more in a direction 104 perpendicular to the rotation axis 102 than portions of the spatially transformed first and second lateral images 420, 430 closer to the center of the central image 310. The central image 310 may be spatially transformed in a manner similar to the spatially transformed first and second lateral images 420, 430. In other words, outer lateral portions of the central image 310 may be shifted more in a direction 104 perpendicular to the rotation axis 102 than portions of the central image 310 closer to the center of the central image 310.

Figure 4B:
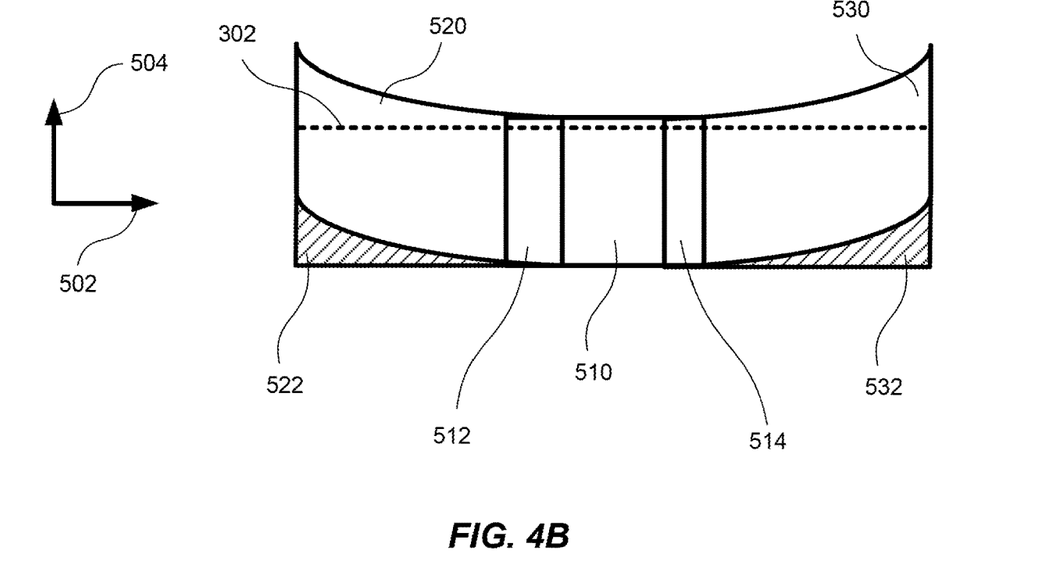
FIG. 4B illustrates spatially transformed images captured by a prior art system for panoramic imaging.

FIG. 4B illustrates spatially transformed images 520, 530. A central image 510 has been captured by a central camera in a prior art system. The spatially transformed first lateral image 520 has been captured by a first lateral camera in the prior art system. The spatially transformed second lateral image 530 has been captured by a second lateral camera in the prior art system. The prior art system is tiltable about a rotation axis 502. It is to be understood that the central image 510 captured by the prior art system may be spatially transformed in a manner similar to the spatially transformed first and second lateral images 520, 530 captured by the prior art system. Imaging systems of the central camera, the first lateral camera, and the second lateral camera in the prior art system have a similar field of view in a direction 504 perpendicular to the rotation axis 502.

In order to produce a panoramic image having a straight virtual horizon, similar to the example shown in FIG. 4A, outer lateral positions of the spatially transformed first and second lateral images 520, 530 in FIG. 4B have been shifted more in a direction 504 perpendicular to the rotation axis 502 than portions of the spatially transformed first and second lateral images 520, 530 closer to the center of the central image 510.

The resulting panoramic image will be cropped in an unsightly manner, since image data associated with a first and a second portion 522, 532 are not present in the first and second lateral images captured by the first and second lateral cameras in the prior art system. The image data associated with the first and second portions 522, 532 are not present in the first and second lateral images since the imaging systems of the central camera, the first lateral camera, and the second lateral camera in the prior art system have similar fields of view in a direction 504 perpendicular to the rotation axis 502. In other words, there is not enough image data in the first and second lateral images captured by the first and second lateral cameras in the prior art system such that a panoramic image with a straight virtual horizon can be produced without cropping the panoramic image in an unsightly manner. More specifically, the panoramic image will not have image data associated with the first portion 522 and the second portion 532.

Comparing FIG. 4B with FIG. 4A, it is realized that a panoramic image produced from FIG. 4A does not need to be cropped in an unsightly manner, since the spatially transformed first and second lateral images 420, 430 in FIG. 4A contains image data associated with portions corresponding to the first and second portions 522, 532 in FIG. 4B.

A skilled person realizes that, even though the description relating to FIG. 3A, FIG. 3B, FIG. 4A, and FIG. 4B is in the context of tilting the system downwards, the description and corresponding directions may be adjusted for tilting the system upwards.

The person skilled in the art realizes that the present inventive concept by no means is limited to the preferred variants described above. On the contrary, many modifications and variations are possible within the scope of the appended claims.

For example, the gyroscope 170 may be arranged near the tilting mechanism 140, on the first lateral camera 120, or on the second lateral camera 130 instead of on the central camera 110 as shown in FIG. 1 and FIG. 2A.

Additionally, variations to the disclosed variants can be understood and effected by the skilled person in practicing the claimed invention, from a study of the drawings, the disclosure, and the appended claims.

The invention claimed is:

1. A tiltable system for panoramic imaging of a scene, comprising:
 a central camera, a first lateral camera and a second lateral camera arranged to image the scene in different directions relative to a rotation axis, wherein the first lateral camera and the second lateral camera are arranged on opposing lateral sides of the central camera, wherein the central camera, the first lateral camera, and the second lateral camera each having an imaging system comprising a lens assembly and an image sensor;
 a tilting mechanism enabling the tiltable system for panoramic imaging to tilt about the rotation axis; and
 an image processing unit comprising a stitching function configured to stitch together images captured by the central camera, the first lateral camera, and the second lateral camera to form a panoramic image of the scene, the panoramic image having a virtual horizon, and to, upon tilting of the tiltable system for panoramic imaging, maintain a position of the virtual horizon of the panoramic image in the scene;

wherein the imaging systems of the first and second lateral cameras have a larger field of view in a direction perpendicular to the rotation axis than the imaging system of the central camera.

2. The tiltable system for panoramic imaging according to claim 1, wherein the lens assemblies of the first and second lateral cameras are configured to provide a larger field of view than the lens assembly of the central camera.

3. The tiltable system for panoramic imaging according to claim 1, wherein a zoom setting of the lens assemblies of the first and second lateral cameras are configured to provide a larger field of view than a zoom setting of the lens assembly of the central camera.

4. The tiltable system for panoramic imaging according to claim 3, further comprising a controller configured to control the zoom settings of the lens assemblies of the first and second lateral cameras, wherein the zoom settings of the lens assemblies of the first and second lateral cameras are based on a tilt of the tiltable system for panoramic imaging.

5. The tiltable system for panoramic imaging according to claim 1, further comprising a gyroscope configured to determine the tilt of the tiltable system for panoramic imaging.

6. The tiltable system for panoramic imaging according to claim 1, wherein the image sensors of the first lateral camera and the second lateral camera have a larger extension in a direction perpendicular to the rotation axis than the image sensor of the central camera so as to provide the larger field of view in the direction perpendicular to the rotation axis.

7. The tiltable system for panoramic imaging according to claim 6, wherein the image sensors of the central camera, the first lateral camera, and the second lateral camera are rectangular, wherein the image sensors of the first and second lateral cameras are oriented with a longer side thereof at an angle relative to the rotation axis, and wherein the image sensor of the central camera is oriented with a longer side thereof parallel to the rotation axis, so as to provide the larger field of view in the direction perpendicular to the rotation axis.

8. The tiltable system for panoramic imaging according to claim 1, wherein the tilting mechanism comprises a tilting motor.

9. The tiltable system for panoramic imaging according to claim 1, wherein a portion of the scene depicted by the first lateral camera partially overlaps a first portion of the scene depicted by the central camera, and wherein a portion of the scene depicted by the second lateral camera partially overlaps a second portion of the scene depicted by the central camera.

10. The tiltable system for panoramic imaging according to claim 1, wherein the image processing unit further comprises:
a feature-recognition function, configured to recognize features related to the virtual horizon in a central image, a first lateral image, and a second lateral image;
an image data transform function, configured to spatially transform image data of the central image, the first lateral image, and the second lateral image, wherein the spatial transform is based on the position of the virtual horizon; and
an alignment function configured to align the features related to the virtual horizon in the central image with the features related to the virtual horizon in the first and second lateral images.

11. The tiltable system for panoramic imaging according to claim 10, wherein the spatial transform in the image data transform function is further based on the tilt of the tiltable system.

12. The tiltable system for panoramic imaging according to claim 10, wherein the spatial transform in the image data transform function is further based on a model of the tiltable system for panoramic imaging.

13. The tiltable system for panoramic imaging according to claim 11, wherein the image processing unit further comprises a cropping function, configured to crop the panoramic image into a rectangular shape.

14. The tiltable system for panoramic imaging according to claim 1, further comprising:
a third lateral camera and a fourth lateral camera arranged to image the scene in different directions relative to the rotation axis, wherein the third lateral camera and the fourth lateral camera are arranged on opposing lateral sides of the first lateral camera and the second lateral camera, wherein the third lateral camera and the fourth lateral camera each having an imaging system comprising a lens assembly and an image sensor;
wherein the stitching function is further configured to stitch together images captured by the central camera, the first lateral camera, the second lateral camera, the third lateral camera, and the fourth lateral camera to form the panoramic image of the scene; and
wherein the imaging systems of the third and fourth lateral cameras have a larger field of view in the direction perpendicular to the rotation axis than the imaging systems of the first and second lateral cameras.

15. The tiltable system for panoramic imaging according to claim 1, further comprising:
a further central camera arranged to image the scene in a direction relative to the rotation axis, wherein the further central camera is arranged on a lateral side of the central camera, wherein the first lateral camera and the second lateral camera are arranged on opposing lateral sides of the central camera and the further central camera, wherein the further central camera has an imaging system comprising a lens assembly and an image sensor; and
wherein the stitching function is further configured to stitch together images captured by the central camera, the further central camera, and the lateral cameras to form the panoramic image of the scene.

* * * * *